United States Patent [19]
Stadler

[11] 3,885,540
[45] May 27, 1975

[54] AIR-FUEL RATIO CONTROL SYSTEM FOR A COMBUSTION ENGINE

[75] Inventor: Henry L. Stadler, Ann Arbor, Mich.

[73] Assignee: Ford Motor Company, Dearborn, Mich.

[22] Filed: June 10, 1974

[21] Appl. No.: 478,025

[52] U.S. Cl............................ 123/119 A; 123/119 A
[51] Int. Cl............................................. F02m 25/06
[58] Field of Search......... 123/119 A, 124 R, 124 A, 123/124 B, 119 D; 60/276, 285

[56] References Cited
UNITED STATES PATENTS

| | | | |
|---|---|---|---|
| 3,042,014 | 7/1962 | Falzone............................ | 123/119 A |
| 3,491,736 | 1/1970 | Walker............................ | 123/119 A |
| 3,645,098 | 2/1972 | Templin.......................... | 123/119 A |
| 3,815,560 | 6/1974 | Wahl et al. .................. | 123/119 A X |
| 3,851,632 | 12/1974 | Teshirogi....................... | 123/119 A |

Primary Examiner—Wendell E. Burns
Attorney, Agent, or Firm—Robert W. Brown; Keith L. Zerschling

[57] ABSTRACT

Improved air-fuel ratio control system for a combustion engine. The system utilizes a sensor, responsive to the partial pressure of oxygen in a gaseous mixture to which the sensor is exposed, to control the ratio of air to fuel supplied to the engine. Prior art systems located the sensor directly in the stream of exhaust gases emanating from the engine. According to the present invention, the engine has an intake conduit, an exhaust conduit and a third conduit interconnecting the intake and exhaust conduits to permit a portion of the engine exhaust gases to be conducted from the exhaust conduit to the intake conduit. The sensor is located in the third conduit for exposure to the gaseous medium therein. Air is admitted, upstream of the sensor, to the third conduit.

9 Claims, 4 Drawing Figures

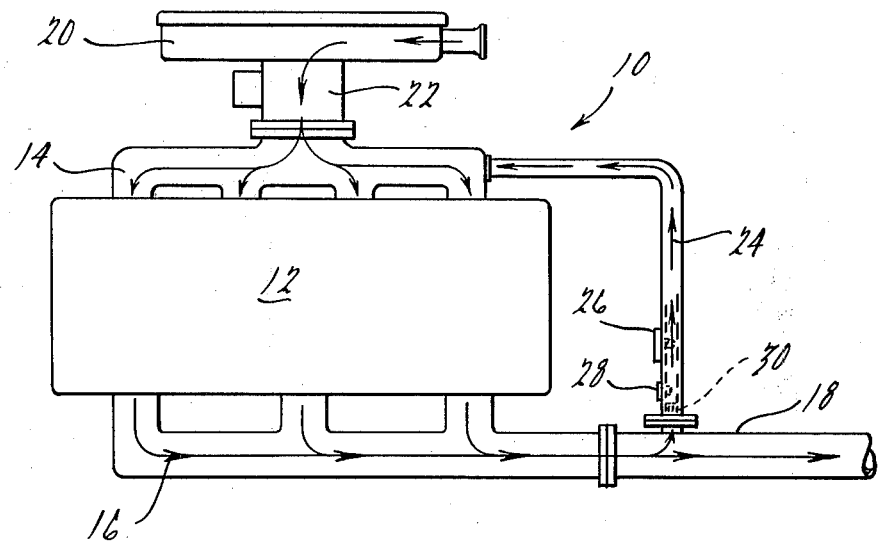
Fig. 1.
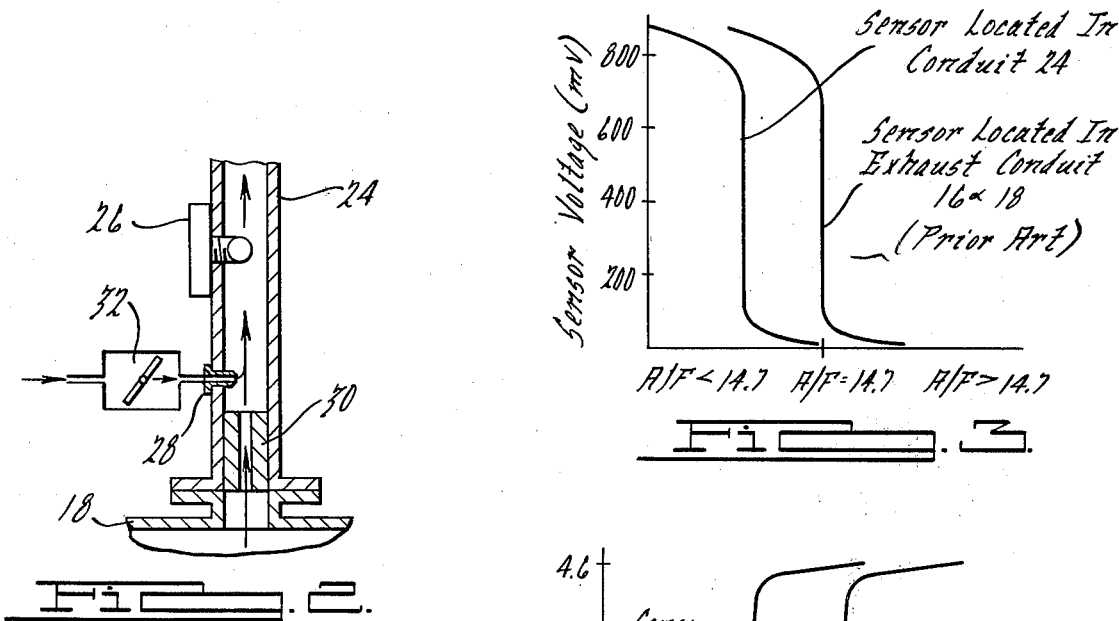
Fig. 2.
Fig. 3.
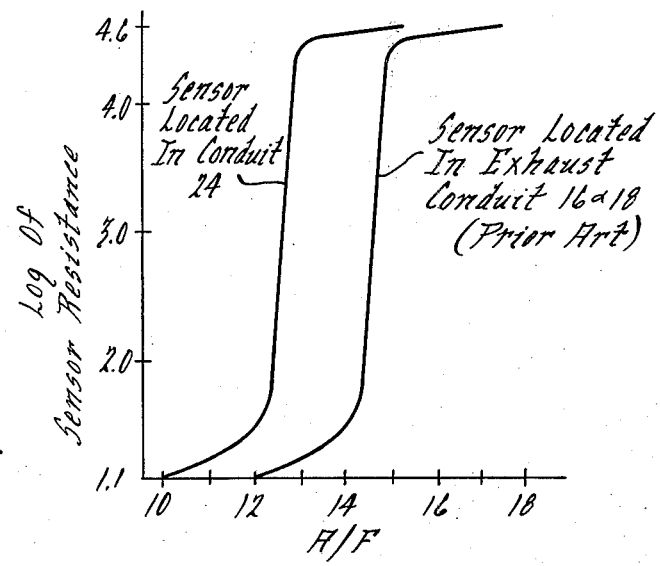
Fig. 4.

AIR-FUEL RATIO CONTROL SYSTEM FOR A COMBUSTION ENGINE

BACKGROUND

This invention relates to an improvement in a system which utilizes a sensor, responsive to the partial pressure of oxygen in a gaseous medium to which the sensor is exposed, to control the ratio of air and fuel supplied to a combustion engine. A prior art system which utilizes a sensor of this kind is disclosed in U.S. Pat. No. 3,768,259 issued Oct. 30, 1973 to R. D. Carnahan et al. Other systems are disclosed in U.S. Pat. No. 3,759,232 issued June 23, 1972 to Josef Wahl et al and in U.S. Pat. application Ser. No. 391,424 filed Aug. 23, 1973 in the name of the present inventor and another and entitled "Method of Manufacture of an Exhaust Gas Sensor for an Air-Fuel Ratio Sensing System." The above patents are incorporated herein by reference to the extent necessary for an understanding and practice of the present invention.

In the above patents and patent application, sensors are positioned directly in the exhaust conduit through which the stream of exhaust gases emanating from an engine are conducted. The sensors are responsive to the partial pressure of oxygen in the exhaust gases. U.S. Pat. Nos. 3,768,259 and 3,759,232 disclose the use of sensors having a solid electrolyte made of zirconium dioxide. Sensors of this kind generate an electromotive force (EMF) across the solid electrolyte. The EMF is a logarithmic function of the partial pressures of oxygen in the gaseous mediums on opposite sides of the electrolyte. Typically, one side of the electrolyte is located in a medium of atmospheric air (a reference medium), and the opposite side of the electrolyte is exposed to engine exhaust gases. For variations in the ratio of air and fuel supplied to the engine where such ratio is near that required for a stoichiometric air-fuel mixture, the EMF of the sensor varies greatly and this variation is used to effect stoichiometric control of air-fuel ratio.

U.S. Pat. application Ser. No. 391,424 discloses the use of a titanium dioxide sensor which, when positioned in the exhaust conduit of an engine, has a large change in its resistance as the ratio of air and fuel supplied to the engine is varied in the region of a stoichiometric mixture.

SUMMARY OF THE INVENTION

In accordance with the invention, sensors responsive to the partial pressure of oxygen in a gaseous medium may be used to effect control of the ratio of air and fuel supplied to a combustion engine at air-fuel ratios substantially richer than stoichiometric.

The invention is an improvement in a system which utilizes a sensor responsive to the partial pressure of oxygen to control the ratio of air to fuel supplied to a combustion engine. The engine has an intake conduit through which air enters the engine and has means for mixing fuel with the air which enters the engine through the intake conduit. An exhaust conduit is included for conducting exhaust gases from the engine. The improvement comprises a third conduit which interconnects the intake conduit and the exhaust conduit. The third conduit permits a portion of the exhaust gases from the engine to be conducted from the exhaust conduit to the intake conduit. The sensor mentioned above is located for exposure to the gaseous medium in the third conduit to sense the partial pressure of oxygen in the gaseous medium.

Means are provided for modifying the partial pressure of oxygen in the engine exhaust gases in the third conduit such that the gaseous medium to which the sensor is exposed has a partial pressure of oxygen different than that of the engine exhaust gases emanating from the engine. The effect of this modification is to cause the sensor to pass through its large voltage or resistance change at a time when the ratio of air and fuel supplied to the engine is other than at or near stoichiometric. The means for accomplishing this modification of the oxygen partial pressure in the gaseous medium may simply be means for admitting air to the third conduit at a location upstream of the sensor location when exhaust gases are flowing from the exhaust conduit to the intake conduit via the third conduit. If desired, means, such as a valve to control the amount of the air admitted to the third conduit, may be provided for controlling for varying the degree to which the partial pressure of oxygen in the gaseous medium is modified during various modes of engine operation.

The invention may be better understood by reference to the detailed description which follows and to the drawings.

BRIEF DESCRIPTION OF THE DRAWINGS

FIG. 1 is a schematic diagram illustrating the manner in which a system utilizing a sensor responsive to the partial pressure of oxygen may be improved to effect engine control using such sensor to control the ratio of air and fuel supplied to the engine;

FIG. 2 is an enlarged sectional view of a portion of the system shown in FIG. 1;

FIG. 3 is a graph of voltage versus air-fuel ratio for a solid electrolyte sensor, such as zirconium dioxide, for both the prior art and improved engine control systems; and FIG. 4 is a graph of resistance versus air-fuel ratio for a resistive-change sensor, such as titanium dioxide, responsive to the partial pressure of oxygen, and illustrates curves for both the prior art and the improved engine control systems.

DETAILED DESCRIPTION

With particular reference now to FIGS. 1 and 2, there is shown an engine system, generally designated by the numeral 10 which includes a combustion engine 12 having an intake manifold 14 and an exhaust manifold 16 to which an exhaust pipe 18 is attached to conduct exhaust gases from the engine 12 to the atmosphere.

The engine system 10 includes the usual air cleaner 20 through which air is inducted into a carburetor or other fuel metering device 22 for mixing fuel with the air supplied to the engine. The engine control system 10, including the fuel metering device 22, may include means for varying the air-fuel ratio in response to the signal produced by a sensor responsive to the partial pressure of oxygen, such as described in either of the aforementioned U.S. Pat. Nos. 3,768,259 and 3,759,232. The arrows associated with the air cleaner 20, the fuel metering device 22 and the intake manifold 14 indicate the flow path of the air and air-fuel mixture inducted through this intake conduit into the engine 12.

Upon combustion of the air-fuel mixture in the combustion engine 12, exhaust gases flow into the exhaust manifold 16 and exhaust pipe 18, as indicated by the arrows associated therewith. The exhaust manifold and exhaust pipe comprise an exhaust conduit for conducting exhaust gases from the engine for discharge to the atmosphere.

A third conduit 24, that is, a conduit in addition to the intake and exhaust conduits, interconnects the exhaust pipe or conduit 18 with the intake manifold or conduit 14. A portion of the exhaust gases conducted through the exhaust conduit flows therefrom, through the conduit 24, and into the intake manifold 14. The conduit 24 includes a sensor, preferably formed of titanium dioxide, located for exposure to the gaseous medium flowing past it within the conduit 24. The sensor 26 also may be formed from a solid electrolyte material, such as zirconium dioxide, in which case its solid electrolyte material must be exposed on one of its sides to the gaseous medium within the conduit 24 and on its other side to a reference medium, such as atmospheric air.

The conduit 24 also includes means 28 for permitting atmospheric air to enter the conduit 24. A portion of the exhaust gases, which portion enters the conduit 24 through an insert 30 having an orifice in it, mixes with the air admitted through the means 28. Since the means 28 is located in the conduit 24 at a location upstream of the location at which the sensor 26 is exposed to the gaseous medium at the conduit 24, the gaseous medium is a mixture of the air admitted to the conduit through the means 28 and the exhaust gases flowing through the insert 30. Thus, the partial pressure of oxygen in the exhaust gases flowing through the exhaust pipe 18 and through the insert 30 into the conduit 24 is modified by the admission to the conduit 24 of air through the means 28. Thus, the sensor 26 is exposed to a gaseous medium having a partial pressure of oxygen modified from that of the exhaust gases emanating from the engine 12.

In prior art engine control systems, the sensor 26 would be located in the exhaust conduit 16 and 18 and would produce its large voltage (EMF) change or resistance change when the air-fuel mixture entering the engine was at or near a stoichiometric mixture. The effect of placing the sensor 26 in the location shown in FIG. 1 and of admitting atmospheric air to exhaust gases drawn from the exhaust conduit, through the conduit 24, and into the intake manifold, is to cause the large change of voltage or resistance of the sensor 26 to occur when the air-fuel mixture entering the engine 12 is substantially richer than stoichiometric for example, 10.0:1. In a mixture of air and gasoline, the stoichiometric air-fuel ratio is about 14.7:1.

Preferably, the insert 30 has an orifice which restricts the flow of exhaust gases from the exhaust pipe 18 into the conduit 24. Also, the means 28 for admitting air into the conduit 24 upstream of the sensor 26 may simply be an orifice located in the wall of the conduit 24. This orifice in the means 28 preferably is substantially smaller than the orifice in the insert 30 and valve means 32 may be provided for limiting the amount of air admitted through the means 28 into the conduit 24. The valve 32 may variably restrict the flow into the conduit 24 in response to various modes of engine operation. Of course, if the valve 32 is closed to prevent air being admitted into the conduit 24, then the partial pressure of oxygen sensed by the sensor 26 will be the partial pressure of oxygen in the exhaust gases emanating from the engine, as is the situation with respect to prior art applications of such sensors.

FIGS. 3 and 4, respectively, depict typical response curves for a solid electrolyte sensor responsive to the partial pressure of oxygen and for a sensor which produces a large resistance change. Each of these Figures shows two curves, one for the case in which the sensor is located directly in the exhaust conduit, as in the prior art practice, and one for the case in which the sensor is located in the conduit 24. From these graphs in FIGS. 3 and 4, it may be seen that the effect of positioning the sensors in the conduit 24 and admitting air upstream of the sensor location is to shift these curves such that their large change in voltage and resistance, respectively, occurs at air-fuel (A/F) ratios substantially richer than stoichiometric. The air admitted to the conduit 24 increases the partial pressure of oxygen to which the sensor is exposed to a level above that of the exhaust gases emanating from the engine 12.

Of course, it may be possible to cause the prior art curves shown in FIGS. 3 and 4 to shift toward a leaner air-fuel ratio indication by modifying the content of the gaseous medium in the conduit 24 to which the sensor 26 is exposed to reduce the partial pressure of oxygen from that which is prevelant in the exhaust gases emanating from the engine 12. Thus, a gaseous component other than air may be admitted into the conduit 24 through the means 28 to effect a reduction of the oxygen content in the exhaust gases entering the conduit 24 through the orifice means 30.

Based upon the foregoing description of the invention, what is claimed is:

1. In a system which utilizes a sensor responsive to the partial pressure of oxygen to control the ratio of air to fuel supplied to a combustion engine, said engine having an intake conduit through which air enters the engine, having means for mixing the fuel with the air which enters said engine through said intake conduit and having an exhaust conduit for conducting exhaust gases from said engine, the improvement which comprises:

a third conduit interconnecting said intake conduit and said exhaust conduit, said third conduit permitting a portion of said exhaust gases of said engine to be conducted from said exhaust conduit to said intake conduit, said sensor being located for exposure to the gaseous medium in said third conduit to sense the partial pressure of oxygen in said gaseous medium, and means for modifying the partial pressure of oxygen in said portion of the exhaust gases of said engine to produce a partial pressure of oxygen in said gaseous medium different than the partial pressure of oxygen in said exhaust gases flowing through said exhaust conduit.

2. The imroved system of claim 1 wherein said third conduit includes means for restricting the flow of exhaust gases from said exhaust conduit into said third conduit.

3. The improved system of claim 2 wherein said means for modifying said partial pressure of oxygen includes means for admitting a gaseous component into said third conduit and valve means for variably controlling the amount of said gaseous component admitted to said third conduit.

4. In a system which utilizes a sensor responsive to the partial pressure of oxygen to control the ratio of air to fuel supplied to a combustion engine, said engine having an intake conduit through which air enters the engine, having means for mixing fuel with the air which enters said engine through said intake conduit and having an exhaust conduit for conducting exhaust gases from said engine, the improvement which comprises:

a third conduit interconnecting said intake conduit and said exhaust conduit, said third conduit permitting a portion of the exhaust gases of said engine to be conducted from said exhaust conduit to said intake conduit, said sensor being located for exposure to the gaseous medium in said third conduit to sense the partial pressure of oxygen in said gaseous medium, and means for admitting air to said third conduit at a location upstream of said sensor location when exhaust gases are flowing from said exhaust conduit to said intake conduit.

5. The improvement of claim 4 wherein said third conduit includes means for restricting the flow of exhaust gases from said exhaust conduit into said third conduit.

6. The improved system of claim 4 wherein said means for admitting air into said third conduit includes valve means for variably controlling the flow of air into said third conduit.

7. The improved system of claim 6 wherein said sensor is comprised of a solid electrolyte one side of which is exposed to said gaseous medium in said third conduit.

8. The improved system of claim 7 wherein said solid electrolyte is zirconium dioxide.

9. The improved system of claim 6 wherein said sensor is comprised of titanium dioxide.

* * * * *